(12) United States Patent
Warll (10) Patent No.: US 10,583,901 B2
(45) Date of Patent: Mar. 10, 2020

(54) PAPER-BASED WATERCRAFT BOARD

(71) Applicant: Stephen Kenneth Warll, Pine Brook, NJ (US)

(72) Inventor: Stephen Kenneth Warll, Pine Brook, NJ (US)

(73) Assignee: Stephen Kenneth Warll, Pine Brook, NJ (US)

(*) Notice: Subject to any disclaimer, the term of this patent is extended or adjusted under 35 U.S.C. 154(b) by 0 days.

(21) Appl. No.: 15/676,121

(22) Filed: Aug. 14, 2017

(65) Prior Publication Data

US 2018/0050767 A1  Feb. 22, 2018

Related U.S. Application Data

(60) Provisional application No. 62/376,691, filed on Aug. 18, 2016.

(51) Int. Cl.
| | |
|---|---|
| *B63B 35/81* | (2006.01) |
| *A63C 5/03* | (2006.01) |
| *B63B 35/79* | (2006.01) |
| *B32B 3/12* | (2006.01) |
| *B32B 5/18* | (2006.01) |
| *B32B 29/08* | (2006.01) |

(52) U.S. Cl.
CPC ............ *B63B 35/7906* (2013.01); *B32B 3/12* (2013.01); *B32B 5/18* (2013.01); *B32B 29/08* (2013.01); *B32B 2605/00* (2013.01)

(58) Field of Classification Search
CPC . B63B 35/79; B63B 35/7906; B63B 2035/79; B63B 2035/7903; B63B 5/02; B63B 5/12; B63B 7/00; B63B 7/02; B63B 3/00; B63B 2003/00; B63B 3/09; B63B 2003/02; B32B 3/12; B32B 5/18; B32B 29/08; B32B 2605/00
USPC ...................................... 441/65, 74
See application file for complete search history.

(56) References Cited

U.S. PATENT DOCUMENTS

| | | | | |
|---|---|---|---|---|
| 3,543,315 A | * | 12/1970 | Hoffman ............. | B29C 44/1266 156/79 |
| 4,255,221 A | * | 3/1981 | Young ................... | B29C 33/307 156/382 |
| 4,797,312 A | * | 1/1989 | Sherwood ........... | B29C 44/1209 428/117 |
| 4,857,380 A | * | 8/1989 | Kent ................... | B29C 44/1209 264/45.3 |
| 5,514,017 A | * | 5/1996 | Chimiak ............. | B63B 35/7909 114/39.14 |
| 6,119,409 A | * | 9/2000 | Makar ...................... | A01K 1/00 441/129 |

(Continued)

OTHER PUBLICATIONS

Notification of Transmittal of the International Search Report and the Written Opinion of the International Searching Authority, or the Declaration for PCT/US17/47397 dated Dec. 26, 2017, 12 pages.

*Primary Examiner* — Daniel V Venne
(74) *Attorney, Agent, or Firm* — Lowenstein Sandler LLP (57) ABSTRACT

A paper-based watercraft board (e.g., a surfboard) and a method of making a paper-based watercraft template (i.e., a blank or core) and watercraft board are described. The surfboard template composes paper-based materials to produce sustainable and recyclable alternative to traditional foam core surfboards.

15 Claims, 8 Drawing Sheets

(56) References Cited

U.S. PATENT DOCUMENTS

| | | | | |
|---|---|---|---|---|
| 6,358,599 B1* | 3/2002 | Deibel | ............... | B32B 5/18 |
| | | | | 428/308.4 |
| 6,623,323 B1* | 9/2003 | Mead | ............... | B29C 33/307 |
| | | | | 114/357 |
| 7,507,133 B2* | 3/2009 | Cheung | ............... | B63B 13/00 |
| | | | | 114/357 |
| 8,662,947 B2* | 3/2014 | Mann | ............... | B63B 35/7906 |
| | | | | 441/65 |
| 2003/0121596 A1* | 7/2003 | Greven | ............... | B29C 47/0028 |
| | | | | 156/196 |
| 2011/0045720 A1 | 2/2011 | Connor, Jr. | | |
| 2012/0118767 A1 | 5/2012 | Koett et al. | | |

* cited by examiner

PAPER-BASED WATERCRAFT BOARD

CROSS-REFERENCE TO RELATED APPLICATION

This application claims the benefit of U.S. Provisional Patent Application No. 62/376,691, filed Aug. 18, 2016, titled "Paper Core Watercraft Board", the entirety of which is hereby incorporated by reference herein.

TECHNICAL FIELD

The present disclosure relates to a watercraft board template, and more particularly, to a surfboard, paddleboard, bodyboard or surfcraft having a core and rails or edges of a board made from paper based products such as honeycomb paper and corrugated paper.

BACKGROUND

Conventional watercraft boards (e.g., surfboards) include a foam core or body. The foam core of traditional surfboards is composed of non-sustainable materials and includes non-recyclable rails.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present disclosure is directed to a watercraft board (herein referred to a "board" or "surfboard") and a method of making a surfboard template (i.e., blank or core) and a surfboard. In one embodiment, the surfboard template composes paper-based materials as an alternative to a conventional foam core. Advantageously, a surfboard template and resulting surfboard according to embodiments of the present disclosure is a sustainable and recyclable alternative to traditional foam core surfboards.

In one embodiment, a watercraft board template or blank includes a ring-shaped frame having an inner cavity (e.g., an open space shaped and sized to receive a body of the template). In one embodiment, body portion may be coupled to the frame to form the watercraft template. In one embodiment, the frame may be composed of a paper-based material. In one embodiment, the frame may include multiple layers or sheets of corrugated paper or similar material. In one embodiment, the body is composed of a corrugated paper-based material. In one embodiment, a surfboard template as described herein may be coated with a coating material in transforming the template into a surfboard. In one embodiment, the coating material may include fiberglass.

In one embodiment, the ring-shaped frame includes an interior surface having portions extending into the inner cavity. In this embodiment, the extended portions are in a U-shaped configuration with a slot (e.g., slot 206 of FIG. 2B) formed between the extended portions. In one embodiment, the frame may be fabricated to include the extended portions and corresponding slot (e.g., slot 206 of FIG. 2B), according to any suitable technique or approach. In one embodiment, the body may be coupled to the frame by inserting at least a portion of the body within the slot (e.g., slot 206 of FIG. 2B) of the frame.

In one embodiment, the ring-shaped frame of the template may be processed to form an outer rail of a surfboard. In one embodiment, the frame may be processed to transform the materials of the frame into an outer rail of a surfboard. In one embodiment, the ring-shaped frame may be shaped by machine processing, sanding, cutting, coating, etc. according to one more specifications corresponding to the surfboard (e.g., shape specifications, length specification, rocker specifications, width specifications, curvature specifications, thickness specifications, etc.). In one embodiment, the frame is machine or otherwise processed to form a smooth, contoured outer rail of a surfboard.

In one embodiment, the ring-shaped frame is corrugated and includes multiple corrugated flutes. In one embodiment, one or more gaps disposed between the multiple flutes may be filled with a pulp material. In one embodiment, the pulp material is made up of paper residue (e.g., paper dust or shavings) that results from the machining, cutting, or other processing of the surfboard template. In one embodiment, the pulp may include the paper residue combined with a water-resistant paper coating. Advantageously, the introduction of the pulp into the frame and the body serves to fortify and strengthen the materials of the corresponding surfboard template.

In one embodiment, a surfboard template includes an outer rail component configured to couple or attach to a frame. In this embodiment, a ring-shaped outer rail may include an interior surface having extended portions (e.g., a first extended portion and a second extended portion) forming a slot (e.g., slot 206 of FIG. 2B). In one embodiment, the extended portions are in a U-shaped configuration with a slot (e.g., slot 206 of FIG. 2B) formed between the extended portions. In one embodiment, the frame is configured to fit or couple within the slot (e.g., slot 206 of FIG. 2B) of the ring-shaped outer rail, such that the frame coupled to the outer rail form an inner cavity configured to receive a body of the surfboard template. In one embodiment, ring-shaped outer rail may be composed of a corrugated paper-based material. In one embodiment, the frame is composed of a corrugated paper-based material.

In this embodiment, the outer rail and frame assembly includes an inner cavity configured to receive a body. In one embodiment, a paper-based body includes a portion (e.g., an extended portion or arm) that is configured to couple within the outer rail and frame assembly within the inner cavity, to form the surfboard template.

In one embodiment, the body is composed of a corrugated paper-based material including multiple corrugated flutes. In one embodiment, one or more gaps disposed between the multiple flutes may be filled with a pulp material. In one embodiment, the pulp material is made up of paper residue (e.g., paper dust or shavings) that results from the machining, cutting, or other processing of the surfboard template. In one embodiment, the pulp may include the paper residue combined with a water-resistant paper coating. Advantageously, the introduction of the pulp into the body serves to fortify and strengthen the materials of the corresponding surfboard template.

In one embodiment, a surfboard template includes a ring-shaped frame including multiple layers or sheets of corrugated paper. In one embodiment, a first layer (or set of sheets) are arranged to create a first extended portion or surface. A body including an extended portion or arm may be arranged such that the extended portion (or step portion) of the body is disposed on the extended portion of the first layer of frame. In one embodiment, the body is nested into the first layer of the frame such that the one or more step portions of the body is disposed on corresponding extended portions of the first layer of the frame. In one embodiment, a second layer of the frame is disposed on the body and the first layer of the frame, such that the extended portion of the body is stacked or sandwiched between the first and second layers of the frame.

Figure 1A:
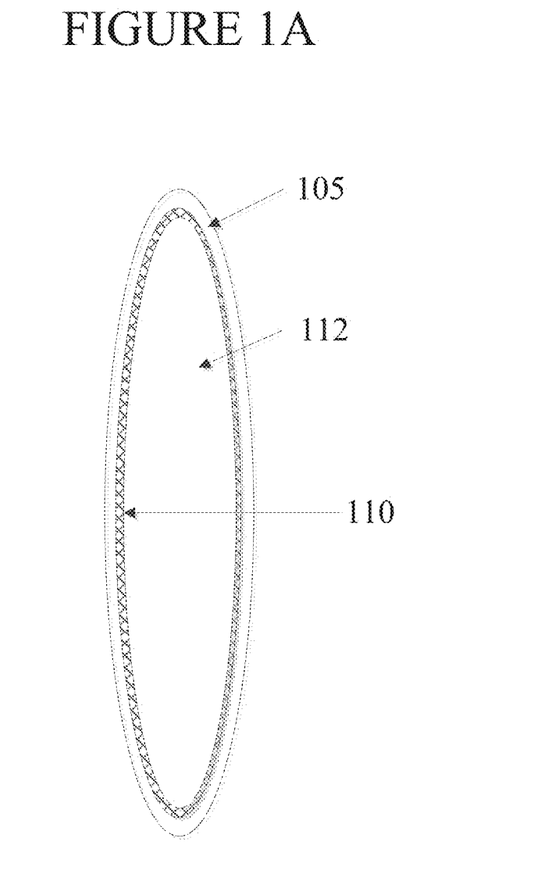
FIG. 1A depicts a top view of an example outer rail and frame assembly, according to one or more embodiments.

FIG. 1A depicts a top view of an outer rail 105 coupled with a frame 110 to form an inner cavity. In one embodiment, the outer rail 105 may be composed of a paper-based material. The outer rail 105 may be composed of corrugated paper including multiple flutes. In one embodiment, the outer rail 105 includes a slot or other opening configured to couple with the frame 110. In one embodiment, the outer rail 105 is shaped, sized, and contoured to specifications corresponding to a watercraft board design. For example, the outer rail 105 may include a smoothed, cylindrically shaped outer surface, such as a rail of a surfboard.

In one embodiment, the frame 110 may be composed of a paper-based material, such as corrugated paper. In one embodiment, the frame 110 may be composed of multiple sheets of corrugated paper stacked or arranged to form a structure configured to couple to the outer rail 105.

Figure 1B:
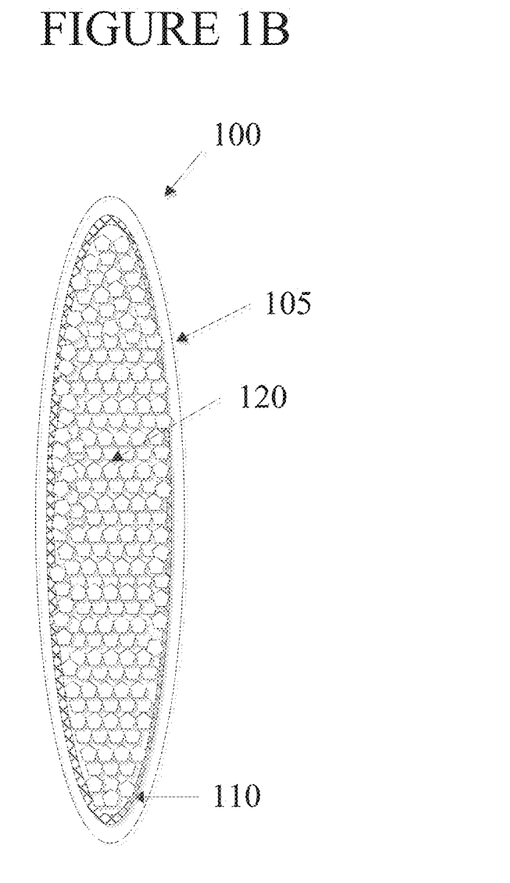
FIG. 1B illustrates a top view of an example watercraft template or blank including an outer rail, a frame, and a body, according to one or more embodiments.

FIG. 1B illustrates a watercraft template 100 includes an outer rail 105, a frame 110, and a body 120 coupled with the frame 110. In one embodiment, the outer rail 105 and the frame are configured in a ring-like shape forming an inner cavity 112. The body 120 may be disposed within the inner cavity and coupled to the frame 110 to form the watercraft template 100. In one embodiment, the body is composed of corrugated paper in a honeycomb-like configuration. In one embodiment, paper-based materials are used to structure the surfboard.

Figure 2A:
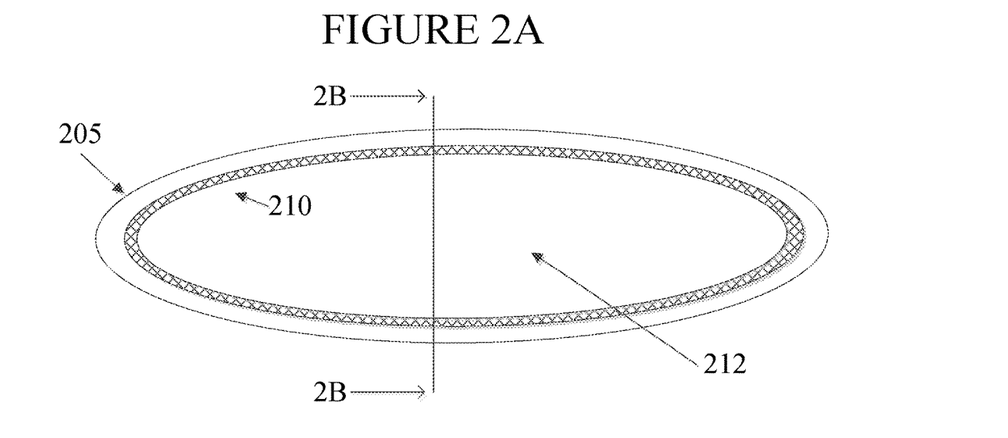
FIG. 2A illustrates a top view of an example watercraft template or blank including an outer rail, a frame, and a body, according to one or more embodiments.
Figure 2B:
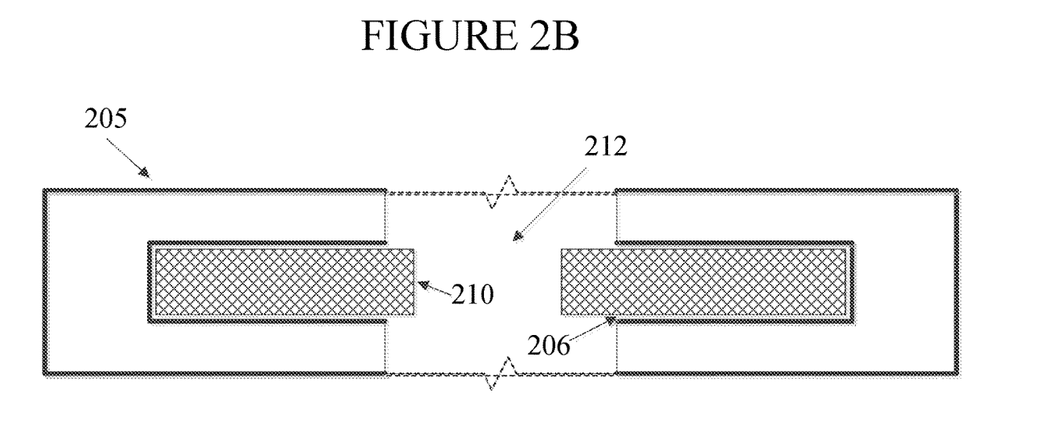
FIG. 2B is a cross-sectional view of an example outer rail and frame assembly, according to one or more embodiments.

FIG. 2A illustrates a top view of an outer rail 205 assembled with a frame 210. As shown, the outer rail 205 and frame 210 assembly forms a ring-shaped inner cavity 212 configured to receive a body during fabrication of a watercraft template. As indicated by the markings on FIG. 2A, FIG. 2B is a cross-sectional view of an example frame 210 assembled with the outer rail 205. As shown in FIG. 2B, the outer rail 205 may include a slot 206 (e.g., an opening formed by two extended portions) within which the frame 210 may be coupled. The frame 210 may be a ring-shaped paper-based structure that extends round a perimeter of a watercraft template. In FIG. 2B, space in between opposing ends or edges of outer rail 205 are denoted with a break line to indicate an indeterminate length. Additionally, for the purposes of illustration, a back (or nose) portion is not shown in FIG. 2B. It is to be appreciated that the outer rail 205 and frame 210 continue in a ring-like manner around a perimeter to form the sides, nose portion, and back portion of the watercraft template.

Figure 3A:
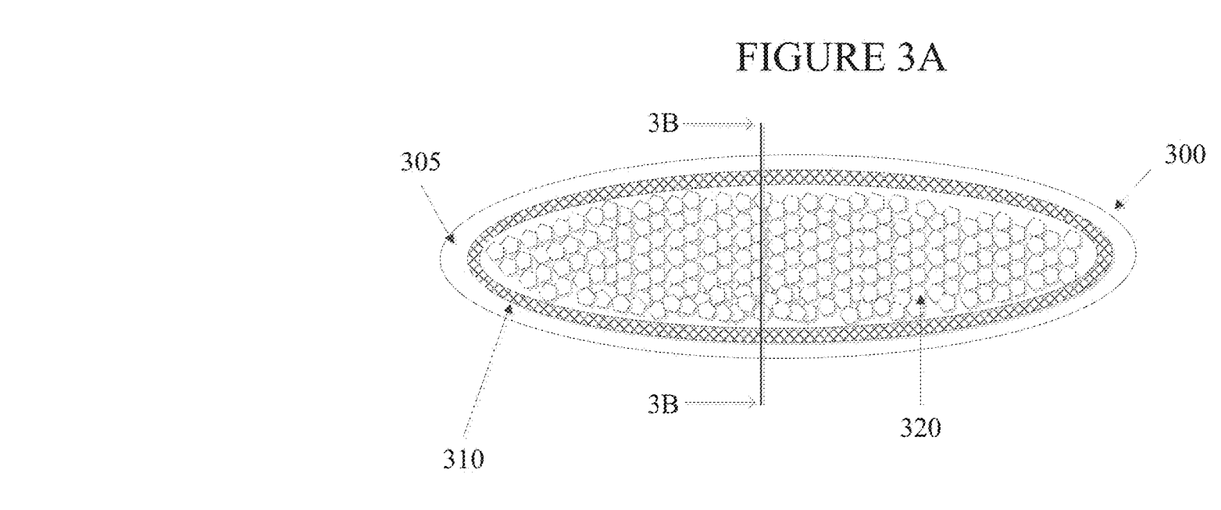
FIG. 3A is a top view of an example watercraft template, according to one or more embodiments.
Figure 3B:
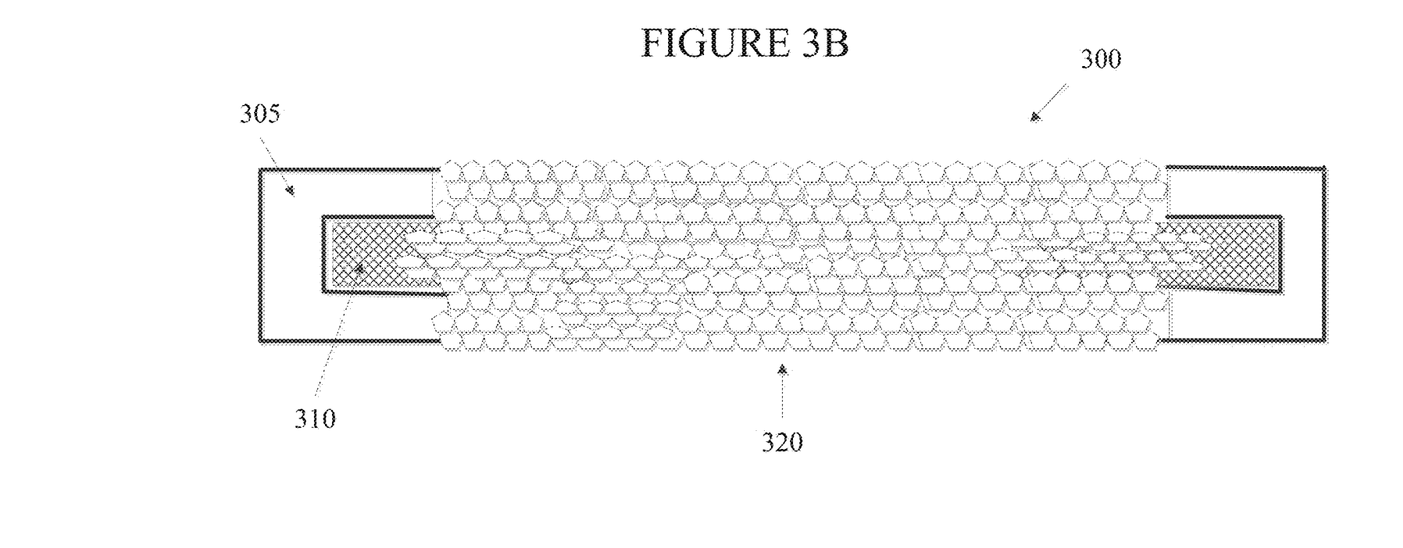
FIG. 3B is a cross-sectional view of a watercraft template, according to one or more embodiments.

FIGS. 3A and 3B illustrate a top view and a cross-sectional view, respectively, of a watercraft template 300 including a rail portion 305, a frame 310, and a body 320 in an assembled configuration. As shown in FIGS. 3A and 3B, the watercraft template 300 includes the body 320 coupled with the outer rail 305 and frame 310 assembly. In one embodiment, one or more of the outer rail 305, the frame 310, and the body 320 are composed of a paper-based material. In one embodiment, the body 320 may composed of corrugated paper in a honeycomb configuration. As shown in FIG. 3B, the watercraft template 300 may be used a blank to fabricate or machine a watercraft board, according to desired board specifications. In one embodiment, a coating (e.g., a fiberglass coating). According to implementations of the present disclosure, the outer rail 305 may be an expandable honeycomb paper structure.

Figure 4A:
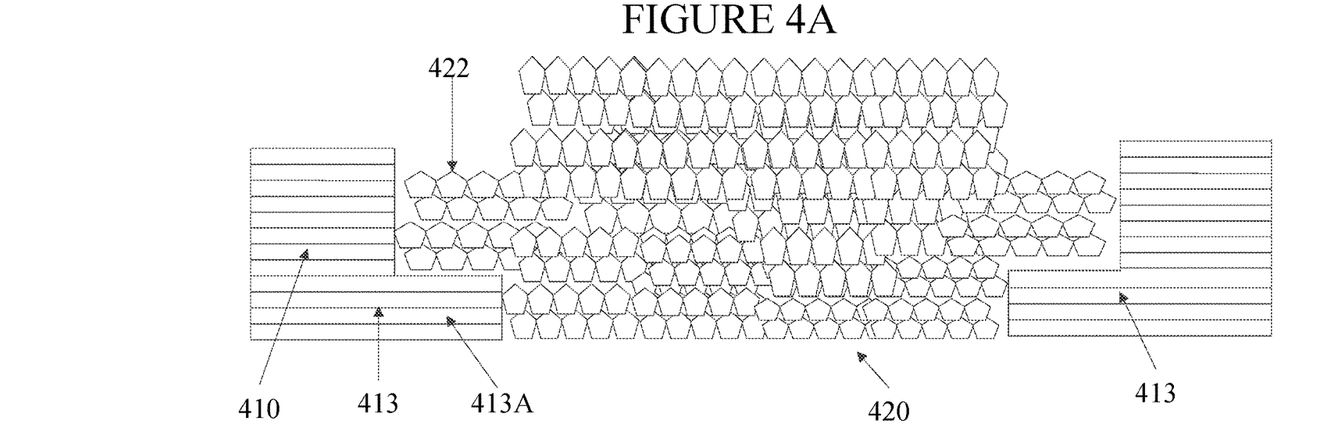
FIGS. 4A and 4B are cross-sectional views of a frame and body during fabrication of a watercraft template, according to one or more embodiments.

FIGS. 4A and 4B illustrate cross-sectional views of a method of coupling a frame 410 and a body 420. As shown in FIG. 4A, the frame 410 may include a first set of layers (or sheets) 413 arranged to form first stepped portion 413A. In one embodiment, the body 420 may be disposed or nested within an inner cavity of the frame 410 such that a portion of the body 420 (e.g., an extended portion 422 shown in FIG. 4A) is disposed on the first stepped portion 413A of the frame 410.

Figure 4B:
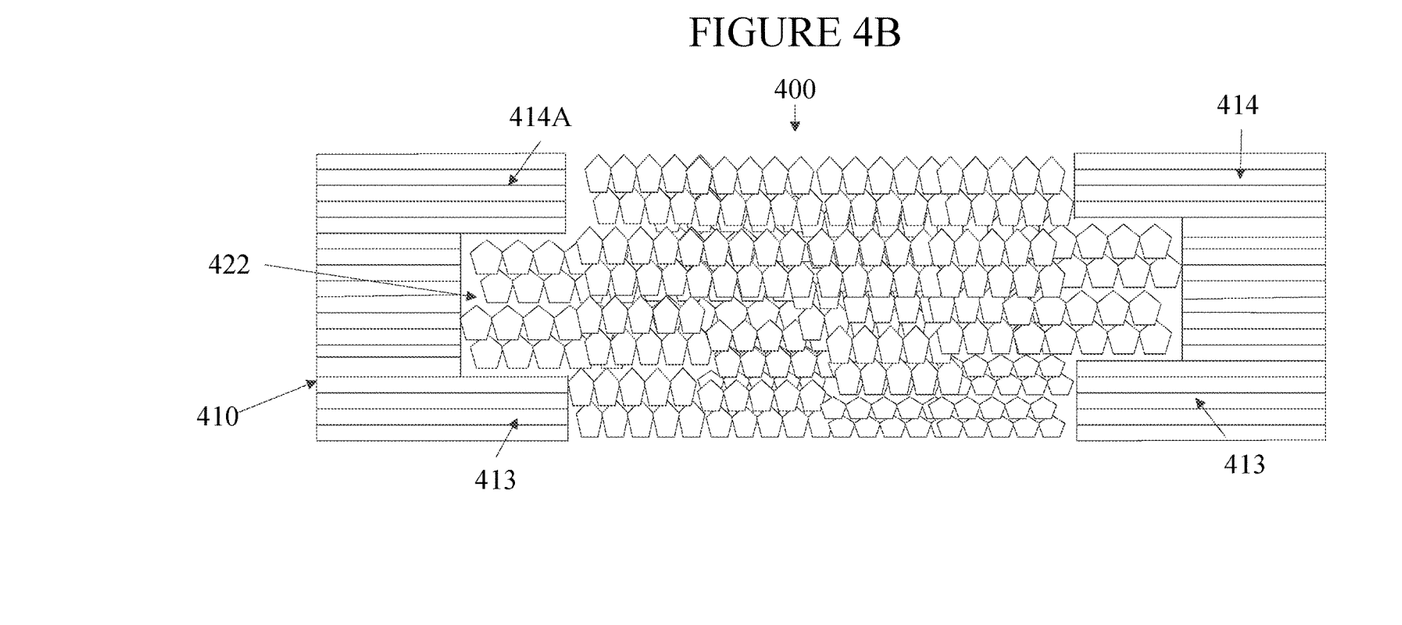

As shown in FIG. 4B, a second set of layers (or sheets) 414 of the frame 410 may be arranged such that a second stepped portion 414A is disposed on top of the extended portion 422 of the body 420. In one embodiment the first layer and the second layer of the frame 410 sandwich at least one extended portion 422 of the body 420 to couple the body 420 in place within the frame 410. In one embodiment, the frame 410 may include multiple sections or stackable layers (e.g., the first layer 413 and the second set of layers 414) that may be arranged to sandwich or secure one or more extended portions 422 of the body 420 between the layers or stacks. In one embodiment, the multiple layers of the frame 410 may be coupled to one another using any suitable approach, such as bonding, gluing, etc.

In one embodiment, the watercraft template 400 may be finished and laminated as used as a blank for fabricating a watercraft board according to desired specifications. Advantageously, the watercraft template 400 may be completely composed of sustainable recyclable paper having desired rocker specifications added during the coupling or bonding process.

Figure 5:
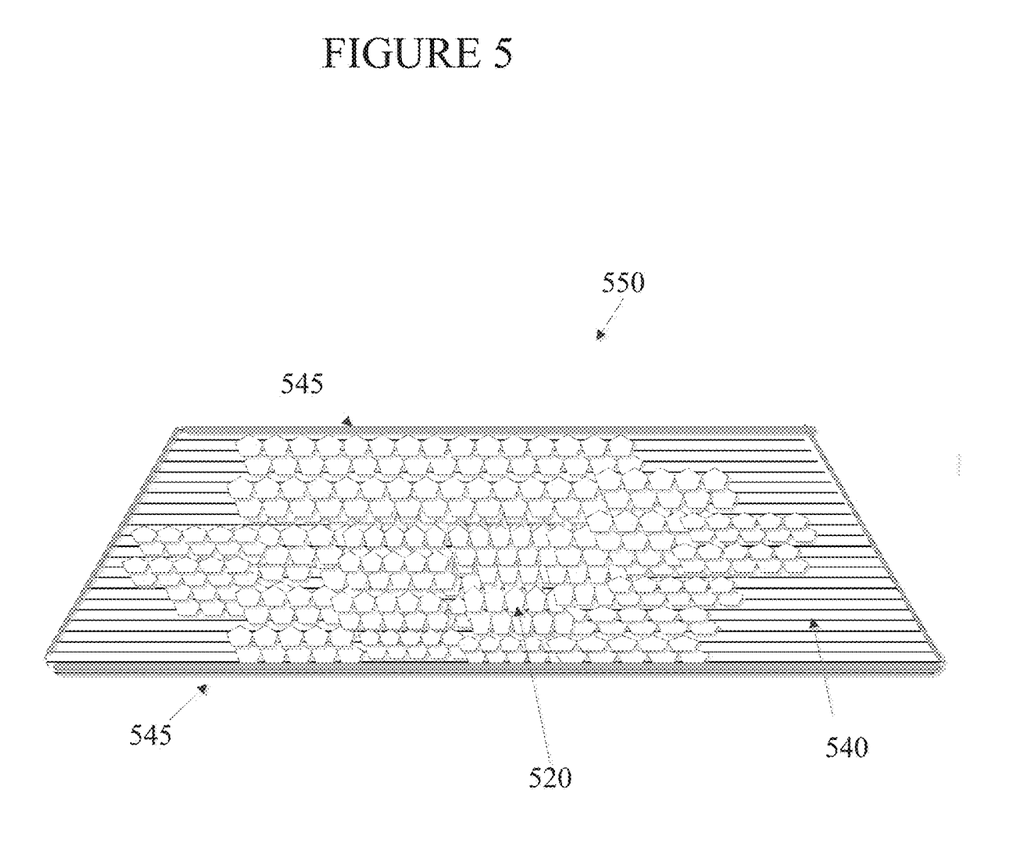
FIG. 5 illustrates a cross-sectional view of a surfboard, according to one or more embodiments.

FIG. 5 illustrates a cross-sectional view of an example watercraft board 550 formed using a watercraft template, as described above. In one embodiment, the watercraft board 550 includes a body 520 coupled within stacked layers of a frame 540. In one embodiment, the watercraft board 550 is shaped and contoured to include an outer rail. In one embodiment, the watercraft board 550 is coated with a coating material 545 (e.g., fiberglass), according to suitable coating processes. In one embodiment, the watercraft board 550 may include a transparent finish to allow light to pass through the watercraft board 550.

Figure 6A:
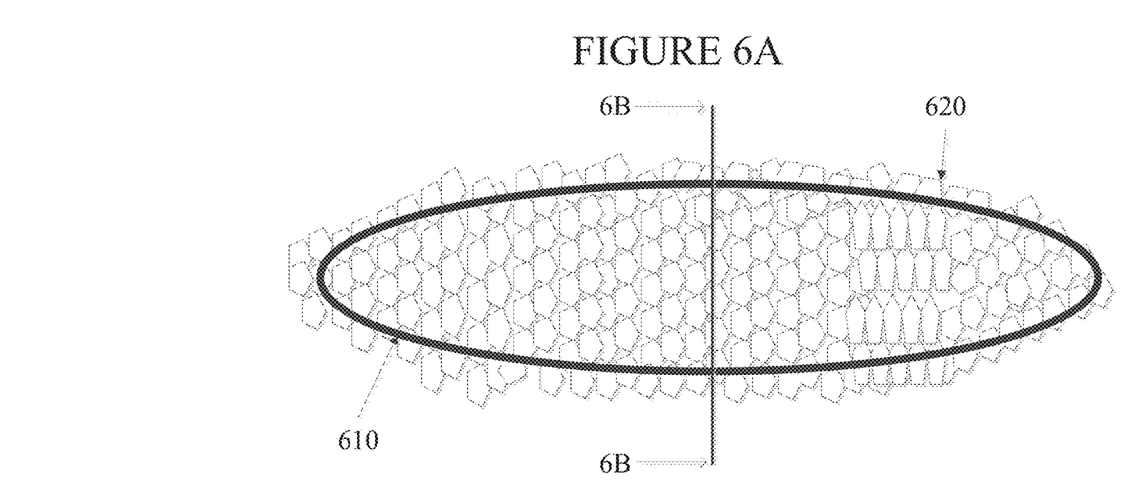
FIG. 6A is a top view of a frame and body of a watercraft template, according to one or more embodiments.
Figure 6B:
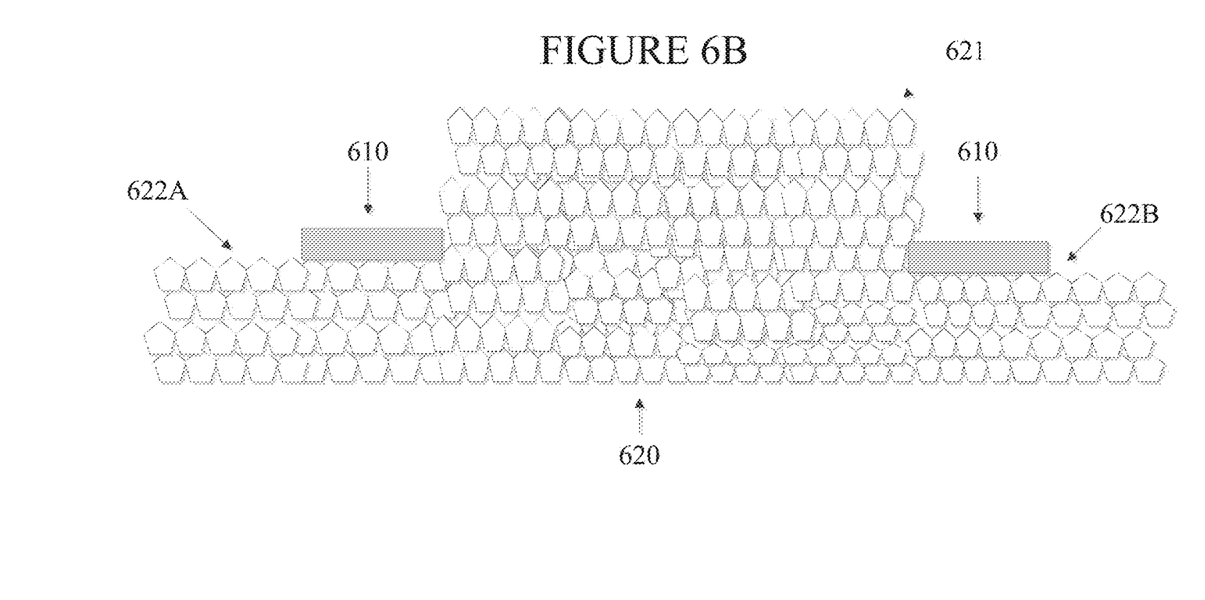
FIG. 6B is a cross-sectional view of a frame disposed on a step portion of a body, according to one or more embodiments.

FIG. 6A illustrates a top view of an example method of proof a frame 610 and body 620 assembly, according to embodiments of the present disclosure. As noted in FIG. 6A, FIG. 6B illustrates a cross-sectional view of a stage during an assembly process relating to the coupling of the frame 610 and the body 620. As shown, the body 620 is shaped to include a raised portion 621 forming two stepped portions 622A, 622B. In one embodiment, the stepped portions 622A, 622B extend around the body 620 in a ring-like shape to form a surface upon which the frame 610 may be disposed.

Figure 7A:
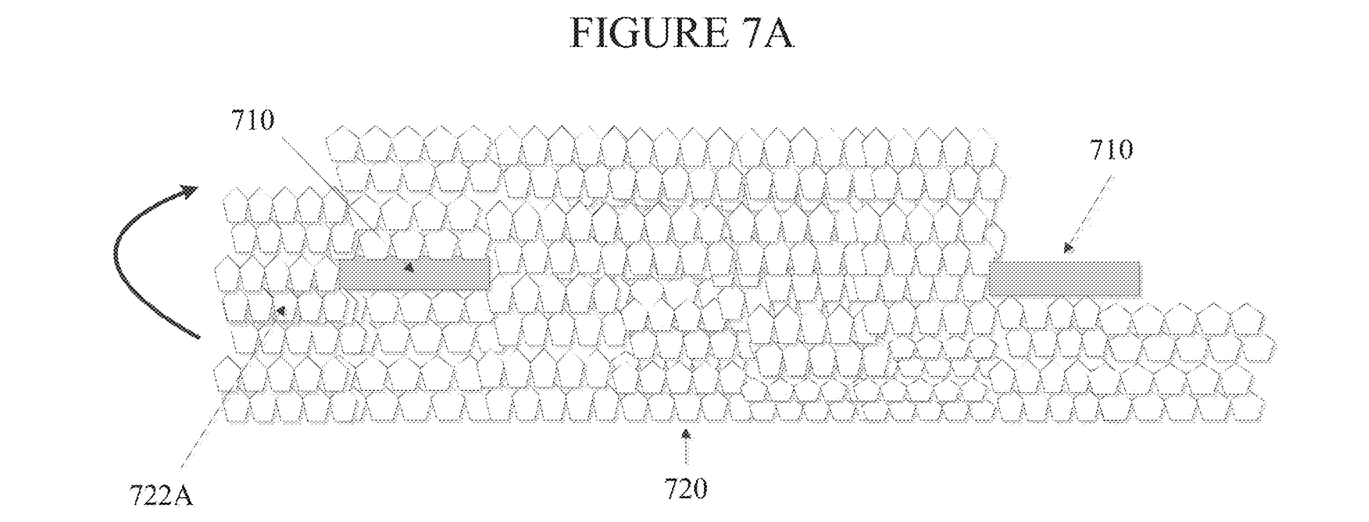
FIGS. 7A and 7B are cross-sectional views of a frame and body assembly at various stages of fabrication, according to one or more embodiments.
Figure 7B:
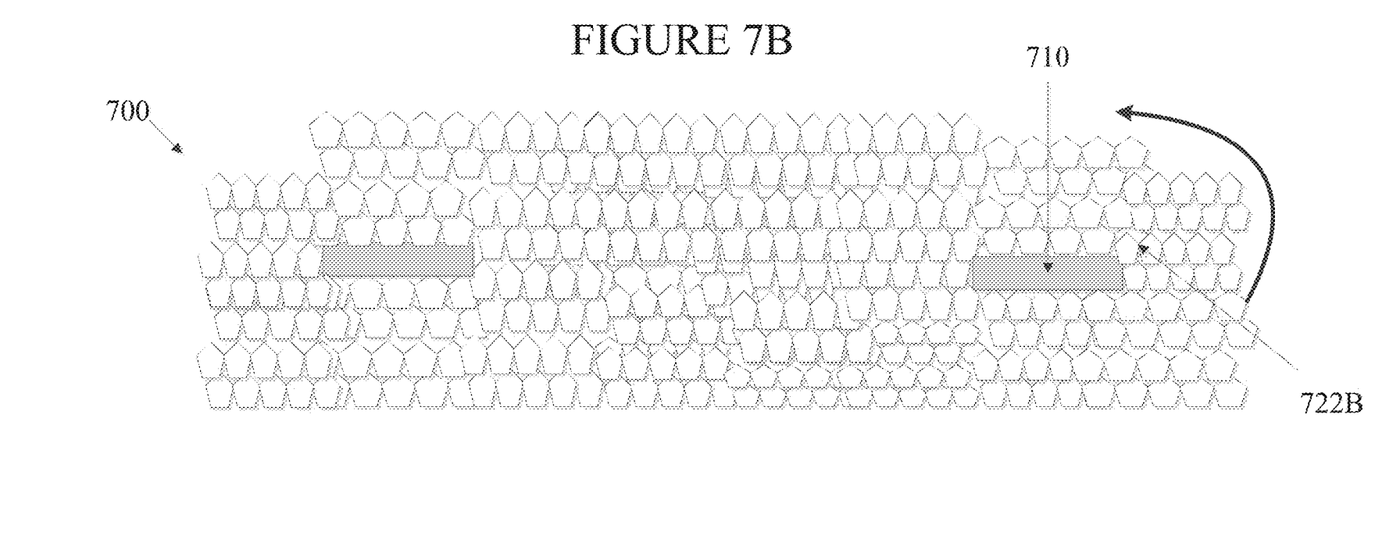

FIG. 7B illustrates a cross-sectional view of a subsequent stage of the assembly process, wherein a first portion 722A of the body 720 is folded or otherwise arranged around or about the frame 710. In one embodiment, as shown in FIG. 7A, the body portion 722A is arranged such that a portion of the frame 710 is enclosed or nested within the body 720. As shown in FIG. 7B, another portion (e.g., a second portion) 722B of the body 720 is folded around another portion of the frame 710. In one embodiment, the portions 722A, 722B of the body 720 are folded or otherwise arranged to enclose the frame 710 within the body.

Figure 8:
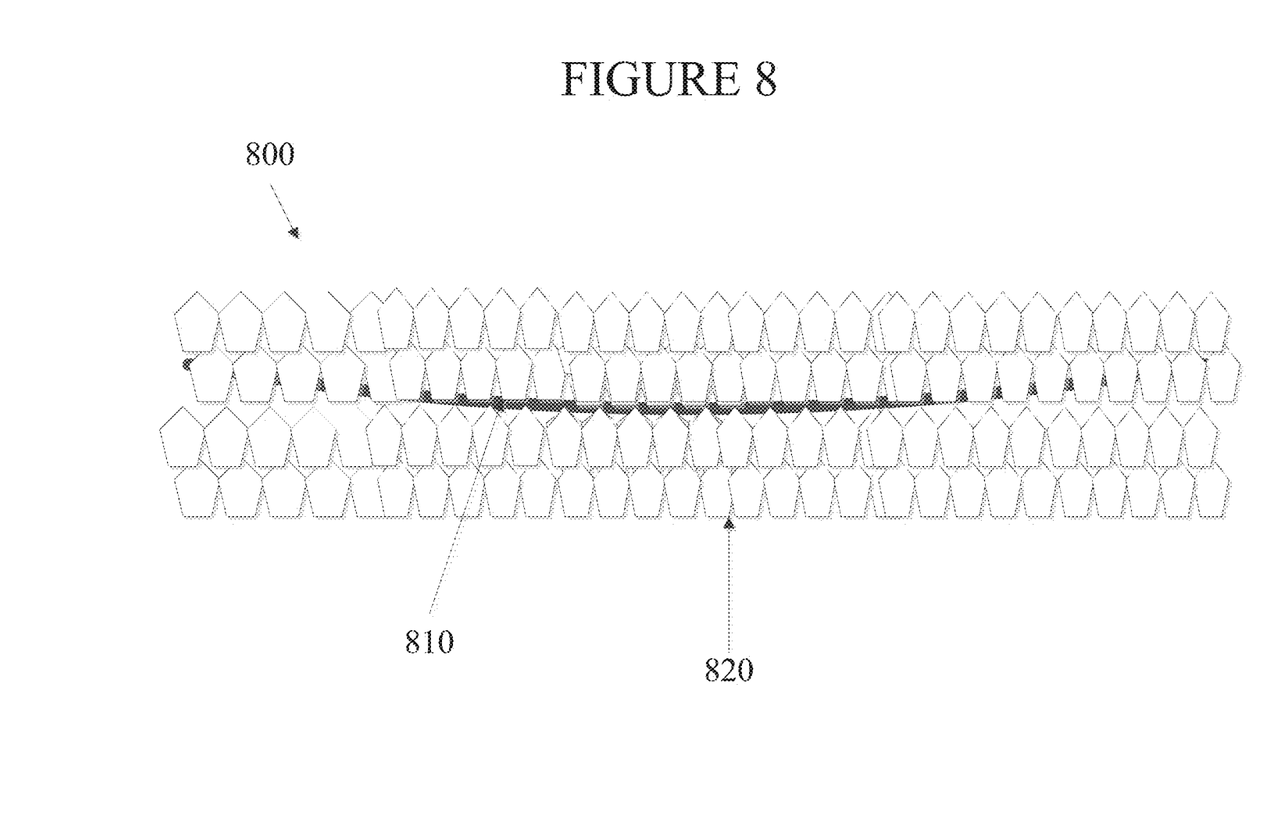
FIG. 8 illustrates a side view of frame and body assembly of a watercraft template, according to one or more embodiments.

FIG. 8 illustrates a side view of an example watercraft template 800 including a frame 810 enclosed within a body 820, according to embodiments of the present disclosure. In one embodiment, the watercraft template 800 may be fabricated according to the steps describes above with respect to FIGS. 6A, 6B, 7A, and 7B. In one embodiment, the rolled frame 810 may be further processed (e.g., sanded, machined, etc.) to have an outer rail according to desired specifications associated with a watercraft board.

According to embodiments of the present disclosure, a sandwiched assembled frame and body create a watercraft template or blank that is an alternative to foam blanks, and can be machined and processed to form a watercraft board. In one embodiment, the watercraft board (e.g., a surfboard) includes an outer rail portion fabricated according to the methods and techniques described herein. In one embodiment, a watercraft template and fabricated watercraft of the present disclosure allows a surfer to ride a board with a completely sustainable body or core that is comparable in strength and weight to industry standards. Advantageously, the watercraft template and resulting watercraft board are more sustainable and less toxic to the environment, and to the exposure of the machinist, as compared to conventional foam boards.

In implementation, the watercraft template includes a body composed of a paper-based material in a honeycomb configuration that enables the option of a transparent or see-through design that allows light to pass through the watercraft board. In one embodiment, a watercraft template may be shaped using a sandwiched blank as an alternative to a foam core. In one embodiment, the watercraft template may be shaped either by hand or by a computer numerical control (CNC) shaping machine that machine shapes various details into the template. In one embodiment, in fabricating the watercraft board from the watercraft template, the watercraft board may be coated with a coating material, such as fiberglass resin or epoxy resin. In one embodiment, an additional center corrugated stringer may be added during fabrication of a watercraft board for rocker and stability. In one embodiment, a watercraft template fabricated in accordance with the description relating to FIGS. 1-8 may be used to design a watercraft board having any desired shape, thickness, and rail specifications.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A watercraft board comprising:
    a ring-shaped frame including an inner cavity, the ring-shaped frame comprising:
        a first set of layers of paper sheets comprising a first stepped portion; and
        a second set of layers of paper sheets disposed on top of the first set of layers of paper sheets, wherein the second set of layers comprises a second stepped portion; and
    a corrugated paper-based body comprising an extended portion disposed between the first stepped portion of the first set of layers and the second stepped portion of the second set of layers to form a surfboard template, wherein the corrugated paper-based body is disposed within the inner cavity of the ring-shaped frame.

2. The watercraft board of claim 1, wherein the first set of layers of paper sheets comprises corrugated material.

3. The watercraft board of claim 2, wherein the second set of layers of paper sheets comprises corrugated material.

4. The watercraft board of claim 1, wherein the corrugated paper-based body is nested within the inner cavity of the ring-shaped frame.

5. The watercraft board of claim 1, wherein the ring-shaped frame comprises a plurality of corrugated flutes.

6. The watercraft board of claim 5, wherein one or more gaps within the plurality of corrugated flutes comprise pulp material.

7. The watercraft board of claim 6, wherein the pulp material comprises paper residue and a water-resistant paper coating.

8. The watercraft board of claim 1, wherein the corrugated paper-based body comprises corrugated paper-based material.

9. A watercraft board comprising:
a corrugated paper-based ring-shaped outer rail comprising an interior surface comprising a first extended portion and a second extended portion extending inwardly to form a slot;
a corrugated paper-based frame coupled within the slot of the corrugated paper-based ring-shaped outer rail, wherein the corrugated paper-based frame comprises an inner cavity; and
a paper-based body comprising at least one portion coupled to the corrugated paper-based frame, wherein the paper-based body is arranged within the inner cavity of the corrugated paper-based frame.

10. The watercraft board of claim 9, wherein at least an outer surface of the ring-shaped outer rail is coated with a coating material.

11. The watercraft board of claim 9, wherein the paper-based body comprises a honeycomb configuration at least partially filled with a pulp material comprising paper residue and a water-resistant paper coating.

12. The watercraft board of claim 9, wherein the paper-based body comprises corrugated paper-based material.

13. A watercraft board comprising:
a paper-based body comprising a raised portion and a stepped portion surrounding the raised portion, and
a ring-shaped frame comprising an inner cavity, wherein the raised portion of the paper-based body is positioned within the inner cavity and the ring-shaped frame is positioned on the ring-shaped stepped portion of the paper-based body, and wherein at least a portion of the ring-shaped stepped portion is folded to at least partially surround the ring-shaped frame to form an outer rail of a surfboard template.

14. The watercraft board of claim 13, further comprising pulp material at least partially filling one or more gaps within the paper-based body.

15. The watercraft board of claim 13, wherein the ring-shaped frame comprises paper.

\* \* \* \* \*